No. 673,221. Patented Apr. 30, 1901.
A. G. PERRY.
CULTIVATOR SHARE OR SHOVEL.
(Application filed Oct. 9, 1900.)
(No Model.) 2 Sheets—Sheet 1.
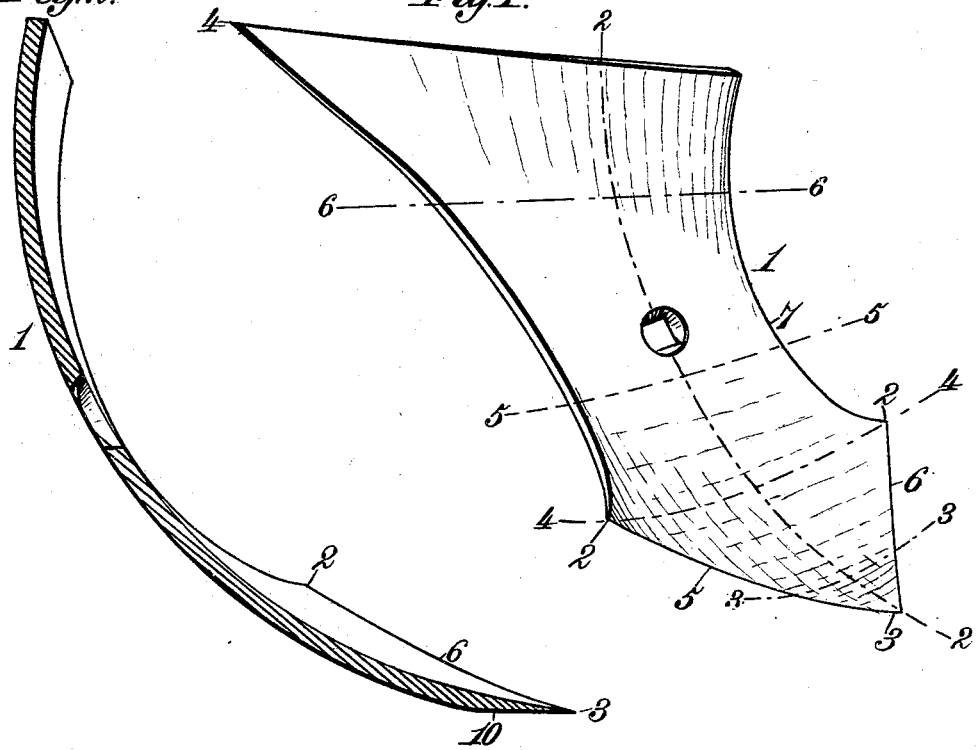
Witnesses.
Robert Everett.
Inventor
Alvy G. Perry.
By James L. Norris.
Atty.

No. 673,221. Patented Apr. 30, 1901.
A. G. PERRY.
CULTIVATOR SHARE OR SHOVEL.
(Application filed Oct. 9, 1900.)

(No Model.) 2 Sheets—Sheet 2.

Witnesses.
Robert Everett.
L. B. Keefer.

Inventor.
Alvy G. Perry.
By James L. Norris.
Atty.

UNITED STATES PATENT OFFICE.

ALVY GREEN PERRY, OF COLDWATER, MISSISSIPPI.

CULTIVATOR SHARE OR SHOVEL.

SPECIFICATION forming part of Letters Patent No. 673,221, dated April 30, 1901.

Application filed October 9, 1900. Serial No. 32,510. (No model.)

*To all whom it may concern:*

Be it known that I, ALVY GREEN PERRY, a citizen of the United States, residing at Coldwater, in the county of Tate and State of Mississippi, have invented new and useful Improvements in Cultivator Shares or Shovels, of which the following is a specification.

This invention relates to a cultivator share or shovel; and it has for its object to provide an improved cultivator share or shovel of peculiar and novel shape by means of which the soil is lifted up, pulverized, inverted, and thrown laterally to one side in such manner as to completely turn in and cover the vegetation. It also has for its object to so shape the under side of the share or shovel that the latter will normally run or be guided in a true straight line, or by tilting or inclining the handles to one side or the other the cultivator will be guided to the other side or in the opposite direction.

To these ends my invention consists in the features and in the construction, combination, and arrangement of parts hereinafter described, and particularly pointed out in the claims following the description, reference being had to the accompanying drawings, forming a part of this specification, wherein—

Figure 7:
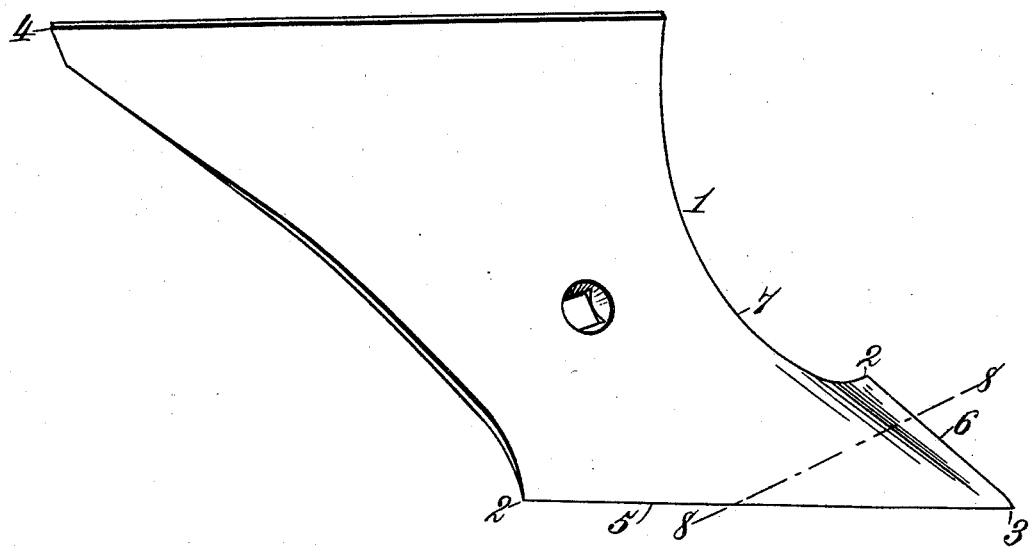
Figure 8:
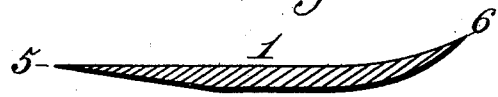

Figure 1 is a perspective view of one form of my improved cultivator share or shovel. Fig. 2 is a vertical longitudinal sectional view thereof, taken on the line 2 2 of Fig. 1. Fig. 3 is a transverse sectional view taken on the line 3 3 of Fig. 1. Fig. 4 is a similar view taken on the line 4 4. Fig. 5 is a similar view taken on the line 5 5. Fig. 6 is a similar view taken on the line 6 6. Fig. 7 is a perspective view of a slightly-modified share or shovel. Fig. 8 is a sectional view of the same, taken on the line 8 8 of Fig. 7.

Referring to the drawings, the numeral 1 indicates the body of the share or shovel; 2, the shoulders or ears; 3, the point; 4, the upper point, and 5 and 6 the cutting edges. The point 3 may be diamond-shaped, as shown in Fig. 1 of the drawings, or the extreme end or tip of the point may be disposed nearer to the landside 7 of the shovel, as shown in Fig. 6, thereby causing the cutting edge 5 to be longer than the cutting edge 6. The particular configuration of the point 3 is not essential, and the shape of the same may be varied to suit the particular purpose for which the cultivator is designed. As shown, the upper surface of the forward end of the share or shovel is concaved, dished, or scoop-shaped, or, in other words, it is concave both transversely and longitudinally, the concavity or curvature commencing at the extreme end or tip of the shovel-point and increasing in depth or curvature until approximately a point is reached that lies between the dotted lines 4 4 and 5 5, Fig. 1. From thence rearwardly the transverse curvature or concavity of the shovel gradually diminishes until it merges into substantially a plane surface; but said portion of the shovel is given a gradual torsional twist or bend toward one side, as shown, to form a moldboard that operates to invert or lay over the soil and throw it laterally to one side in a well-known manner. The torsional twist or bend of the share gradually increases from its initial point until it reaches the extreme top of the share.

In the drawings I have illustrated a right-hand share or shovel; but it will be manifest that the same may be made left-handed. By forming the forward portion of the share or shovel concave, dish, or scoop shaped the cutting edges 5 and 6 are raised upward and thrown forward of the body portion of the share, whereby said cutting edges are so presented to the soil as to slice or trim the latter smoothly and easily, instead of breaking or tearing it from the land, and render the draft of the cultivator light. The concave, dish, or scoop shape of the forward portion of the plow catches and scoops up all the soil it comes in contact with and carries it directly upward until it reaches the twisted and upwardly-curved portion of the share, which latter lifts the soil still higher and at the same time turns it over and to one side, thereby inverting the soil and turning under weeds and other undesirable vegetation. The scoop or dish shape of the share takes up all the soil cut or sliced by the cutting edges, and as the soil is forced up the share the curvature of the latter bends, breaks up and disintegrates the soil, and the twisted upper portion of the share then operates to turn over the pulverized soil and lay it to one side, or toward the growing plants being cultivated. The under side of the plow-point is beveled off along the cutting edges, as shown at 9, to render the cutting edges sharp and make their entrance into the earth easy, and also results, in connection with the rounded convex shape of the under side of the share or shovel, in forming a protuberant rib 10, which extends a suitable distance centrally in rear of the extreme tip of the plow-point and thence merges into the transversely-flat under side of the share or shovel for the purpose hereinafter explained.

By forming the protuberant rib 10 on the convex under side of the share or shovel, as shown, the share or shovel is caused to run at an even depth in the soil and is prevented from dipping in or out of the soil and from one side to the other, and by sliding through the soil for some distance behind the cutting edge of the share or shovel it provides a bearing that prevents the share or shovel from being thrust laterally to one side by the pressure of the soil. The rib referred to also serves an important function in guiding the shovel in cultivating young plants, the rib causing the shovel to run in a straight line when the handles are held straight; but by inclining the latter to the right of a vertical position the shovel will be caused to run to the left, and vice versa, thus permitting the cultivator to be controlled with ease.

Having described my invention, what I claim is—

1. A cultivator share or shovel, concave on its upper forward portion both longitudinally and transversely to form a dish or scoop shaped point and gradually merging into a plane surface from said concave portion toward its rear end, said portion in rear of the concave portion being twisted torsionally to one side, substantially as described and for the purpose specified.

2. A cultivator share or shovel concave on its upper forward portion both longitudinally and transversely to form a dish or scoop shaped point and gradually merging into a plane surface twisted torsionally to one side, the twist or torsional curvature gradually increasing from the concave portion to the extreme rear end of the share, substantially as described.

In testimony whereof I have hereunto set my hand in presence of two subscribing witnesses.

ALVY GREEN PERRY.

Witnesses:
R. A. JACKSON,
W. R. GILLILAND.